United States Patent [19]

Silverstein

[11] Patent Number: 5,681,471
[45] Date of Patent: Oct. 28, 1997

[54] BIOLOGICAL DENITRIFICATION OF WATER

[75] Inventor: JoAnn Silverstein, Boulder, Colo.

[73] Assignee: The Regents of the University of Colorado, Boulder, Colo.

[21] Appl. No.: 583,848

[22] Filed: Jan. 11, 1996

[51] Int. Cl.$^6$ .................................................. C02F 3/30
[52] U.S. Cl. ........................... 210/614; 210/617; 210/618; 210/903
[58] Field of Search .................................. 210/605, 614, 210/615, 617, 618, 903

[56] References Cited

U.S. PATENT DOCUMENTS

| | | | |
|---|---|---|---|
| 4,045,344 | 8/1977 | Yokota | 210/151 |
| 4,279,753 | 7/1981 | Nielson et al. | 210/615 |
| 4,351,729 | 9/1982 | Witt | 210/617 |
| 4,696,747 | 9/1987 | Verstraete et al. | 210/617 |
| 4,765,892 | 8/1988 | Hulbert et al. | 210/290 |
| 5,080,793 | 1/1992 | Urlings | 210/617 |

FOREIGN PATENT DOCUMENTS 9325483  12/1993  WIPO .

OTHER PUBLICATIONS

Barrett et al., "Manual of Design for Slow Sand Filtration", pp. 91–96, 173–184, 193–198, 1991.
Cook et al., "Field Demonstration of Biological Denitrification of Polluted Groundwater" and Pilot Scale Field Testing of Biological Denitrification With Widely Varied Hydraulic Loading Rates, Dec., 1991, *Colorado Water Resources Research Institute, Colorado State University*, Completion Report No. 162.
Cook et al., "Biological Denitrification of Polluted Groundwater", Sep., 1989, *Colorado Water Resources Research Institute, Colorado State University*, Completion Report No. 153.

*Primary Examiner*—Christopher Upton
*Attorney, Agent, or Firm*—Sheridan Ross P.C.

[57] ABSTRACT

Biological denitrification of water using one or more bioreactor units containing bioreactor media, a prefilter assembly containing prefilter media, and a slow sand filter containing sand filter media. Each bioreactor unit requires certain water flow related values and the bioreactor media must have certain material or dimensional characteristics. An air scouring process is constrained to predetermined parameter values to remove excess biomass material from the bioreactor media. The prefilter assembly also includes a flow distribution device for providing uniform water flow throughout the cross-section of the prefilter media. In one embodiment, the prefilter assembly and the slow sand filter assembly are semi-portable in that they have a reduced size with limited dimensions. This enables the prefilter assembly and the slow sand filter assembly to be made at a remote location and transported to the site at which water is to be denitrified. The semi-portable aspect of the slow sand filter assembly results from a number of structural aspects including being made of modular filter containers, thin, reinforced walls being made of weldable materials, lifting elements connected to the walls, a container floor supported by a platform and filtered water carrying pipes that communicate with a common pipe located outside of the filter container.

7 Claims, 8 Drawing Sheets

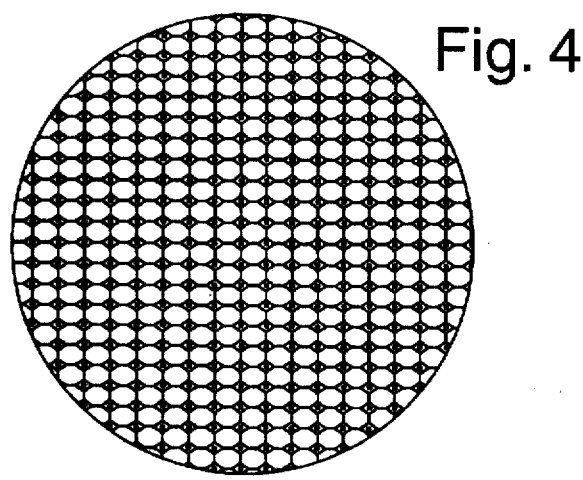
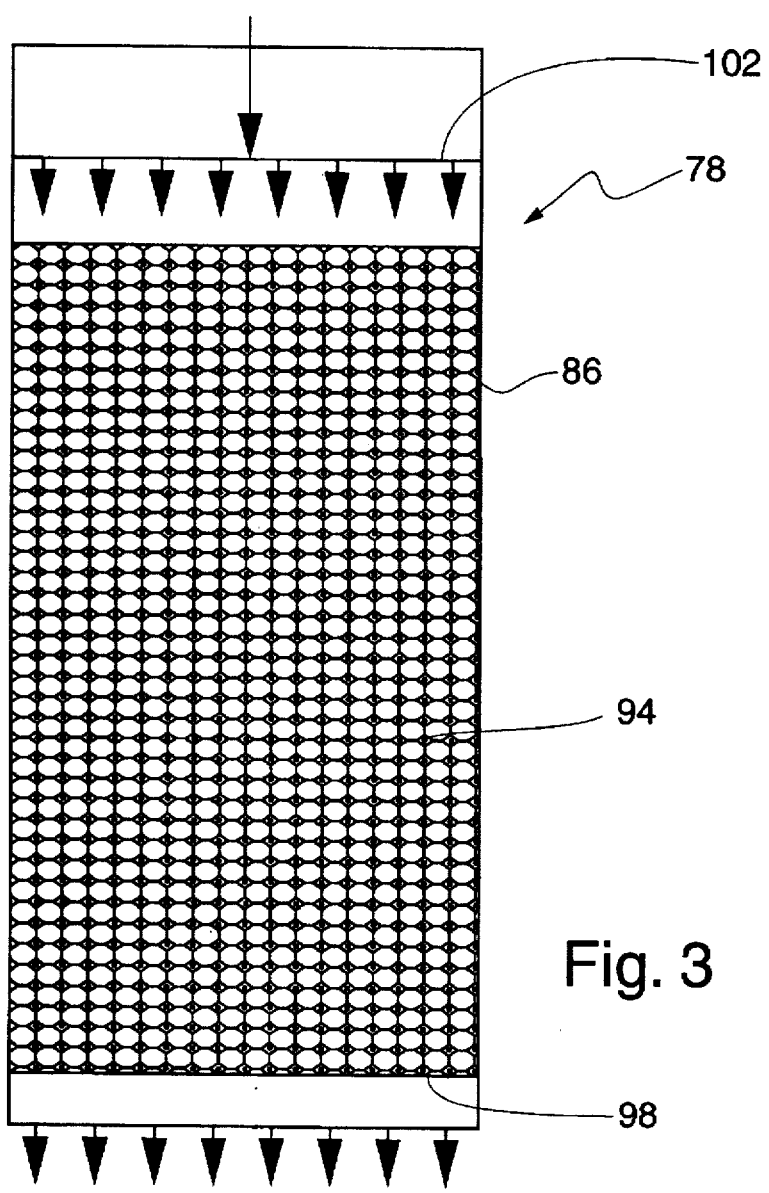
Fig. 4
Fig. 3

BIOLOGICAL DENITRIFICATION OF WATER

FIELD OF THE INVENTION

The present invention relates to the biological denitrification of water to provide acceptable drinking water and, in particular, a system that includes one or more bioreactor units for removing nitrates and nitrites from water, together with a prefilter assembly and a slow sand filter assembly for removal of organic matter from the denitrified water.

BACKGROUND OF THE INVENTION

Nitrate contamination of drinking water has been identified as a growing problem. Consumption of nitrate-contaminated water results in serious health disorders, especially for infants. Drinking supplies cannot contain greater than the U.S. primary drinking water standard (maximum contaminant level) of 10 mg/l nitrate-nitrogen.

Because nitrate is very soluble, therefore highly mobile in water, it has become a common groundwater contaminant. The major sources of nitrates in groundwater are agricultural fertilizers, both chemical and natural, feed lot waste, certain industrial wastewaters, other wastewaters and sludge. Nitrate contamination of groundwater is a particularly acute problem for rural or semi-rural communities where substantial fertilization, feed lots and minimal wastewater treatment have caused nitrate concentrations to reach unsatisfactory levels.

One known method for removing nitrates from water involves the biological denitrification of the water. Denitrification is a bacterial respiration process in which nitrate is reduced to produce dinitrogen gas primarily and nitrous oxide as end products. Denitrification is carried out by numerous bacterial species found in the soil and aquatic environments. These bacteria are primarily facultative heterotrophs, which can respire using either oxidized nitrogen or oxygen as a terminal electron acceptor. Denitrification is inhibited by the presence of oxygen which is a more energetically favorable electron acceptor for the bacterial cell. Heterotrophs require an organic carbon energy source (electron donor) for respiration. Since most drinking water supplies contain very little organic carbon, supplemental organic carbon is typically added to the influent that is received by a denitrification stage. Also, biological denitrification is optimized by maximum contact between nitrate contaminated water and the microorganism.

With regard to known biological denitrification of water techniques or processes, a denitrification reactor was described that was packed with high porosity plastic media. This media had a coating of biomass material. Part of the reactor was reserved for a bed expansion associated with the plastic media during an air scouring procedure that was periodically carried out to remove excess biomass. Such removal of excess biomass material, which accumulated in the denitrification reactor due to bacterial growth, was necessary for proper operation of the denitrification reactor. Although such a denitrification reactor and an air scouring procedure associated therewith have been generally described, it is important to optimize or facilitate the denitrification process and the air scouring procedure using previously unknown parameters.

Also as part of the biological denitrification of water processing, it is necessary to provide one or more filter assemblies downstream of the denitrification stage. Such filter assemblies are used to remove unwanted organic matter from the denitrified water. Although different types of filter assemblies have been described, it appears that such filter assemblies are complex, relatively expensive and difficult and/or time consuming to manufacture and assemble at the site at which the raw water is to be denitrified. In that regard, there is a need for filtering equipment that performs the necessary task but reduces the amount of time taken to remove the filtered materials, while properly and efficiently performing the filtering functions. Additionally, even though numerous slow sand filters have been devised, they are typically very large and are built at the site at which the water is to be denitrified. In view of these perceived drawbacks to presently devised implementations for denitrification of water, especially in lower populated communities, it would be advantageous to provide a biological denitrification of water system that overcomes any such drawbacks and meets desired objectives.

SUMMARY OF THE INVENTION

In accordance with the present invention, an apparatus is disclosed for providing denitrification of water, together with removal of particulate and soluble organic matter from the denitrified water. The apparatus includes a bioreactor assembly for removing nitrates from influent water. In one embodiment, the bioreactor assembly includes at least first and second bioreactor units or towers that are in serial communication with each other; however, only one bioreactor unit could be used. Raw water from an underground source or a community's water supply is received by the first bioreactor unit and denitrified effluent water from the first bioreactor unit is then sent to the second bioreactor unit. Each bioreactor unit contains bioreactor or packing media having high porosity. The media surfaces are coated with a thick film of biomass for reacting with the nitrate-containing water in order to denitrify the water. In addition to the raw water inputted to the first bioreactor unit, a source of organic carbon for bacterial energy and growth is also provided to supplement the raw water with organic carbon. In one embodiment, the carbon source is acetic acid.

The bioreactor media has certain characteristics or parameters that are necessary to support the thick or dense biofilm coating on the media surfaces, together with insuring dispersed plug flow of water to be denitrified through the bioreactor unit. Such dispersed plug flow avoids water "channelization" in which water to be denitrified flows or "channels" through the bioreactor media without desired contact with the biofilm. In addition to the bioreactor media having such characteristics, it is also important that the surface hydraulic loading rate, volumetric nitrate loading and the Peclet number be within predetermined ranges in order to promote the necessary thick biofilm and dispersed plug flow. The surface hydraulic loading rate refers to a volumetric flow rate of water to be denitrified per cross-sectional surface area in the bioreactor unit. The volumetric nitrate loading refers to the concentration of nitrate in the water having a particular volumetric flow rate and the bioreactor unit having a particular or known volume, where this volume is an empty bed (no bioreactor media). The Peclet number refers to a parameter that is indicative of dispersed plug flow.

Periodically, each bioreactor unit must have excess biofilm removed in order to maintain uniform dispersed plug flow and avoid channelization. Excess biofilm results from growth thereof in the bioreactor unit. To remove excess biomass, an air scouring procedure is utilized. Generally, air bubbles from a diffuser disposed at the bottom of each bioreactor tower are allowed to pass upwardly through a fluidized bed of bioreactor media. The air bubbles shear excess biomass material from the bioreactor media. The frequency of air scouring is determined based on the dynamic pressure head associated with the bioreactor unit, which pressure head is measured at the base of the bioreactor unit. The diffuser orifice has a size that is large enough to insure bubble size that is sufficient for shearing, yet small enough to efficiently separate the biofilm-coated bioreactor media.

The denitrification steps carried out by the first and second bioreactor units result in a waste organic material or by-product being added to the water. Removal of such organic material in the system is accomplished using a prefilter assembly and a slow sand filter assembly, which is located downstream of the prefilter assembly. The prefilter assembly includes packed prefilter media of very high porosity contained in a prefilter body of the prefilter assembly. Disposed adjacent to the upper end of the prefilter body and above the packed prefilter media is a flow distribution device. This device distributes the denitrified influent water that it receives uniformly over the cross-sectional surface of the prefilter media. Organic matter in the denitrified water is removed by a combination of sorption of organic molecules to the biofilm-coated surfaces of the prefilter media and biodegradation as the organic compounds diffuse to bacteria living in the biofilm on the surfaces of the media which metabolize the bacteria. In one embodiment, the flow distribution device is a conical-shaped device that gradually expands the area of a given volume of influent water. Such a device outputs the same amount or volume of water at the center thereof as it does along any portion of its outlet end. Accordingly, there is no channelling or uneven concentration of influent water along the wall of the prefilter body or uneven distribution along any portion of the cross-sectional area of the prefilter body. This construction promotes efficient and desired removal of organic components.

With regard to controlling the removal of organic material, the prefilter assembly takes into account or incorporates a number of factors or parameters. For acceptable performance, the organic loading rate (OLR) associated with the prefilter assembly should be within a desired range. The OLR refers to the amount of total organic carbon (TOC) that is removed by the prefilter assembly for a given volume of prefilter media and for a given time period. The TOC refers to the soluble and colloidal organic material that is removed by the prefilter assembly. The minimum OLR should be only enough to sustain biofilm growth and the maximum OLR should not exceed the capacity of the prefilter assembly to remove the TOC by a combination of sorption and biodegradation. A hydraulic loading rate (HLR) of the prefilter assembly should be set to assure substantial wetting of the biofilm-coated prefilter media surfaces and the maximum value of the HLR should be set to insure thin-film flow of the denitrified water in the prefilter assembly. The HLR refers to the water flow rate divided by the total cross-sectional area associated with the prefilter assembly. A detention time parameter ($\tau_p$) is also important in proper operation of the prefilter assembly. The detention time refers to the amount of time that the denitrified water is present and in contact with the prefilter media in the prefilter body. The detention time has a minimum or threshold time period.

In one embodiment, the prefilter assembly is "semi-portable" in that it is of a size and has dimensions that permit it to be made at a location remote from the site at which water is to be filtered using the prefilter assembly and where transportation of the prefilter assembly is readily accomplished. In such an embodiment, the prefilter assembly can be assembled at the site at which water is to be filtered, including incorporating the flow distribution device and the prefilter media into the prefilter body.

The slow sand filter assembly is downstream of the prefilter assembly and is useful in further removing fine particulate organic material from the influent water that it receives from the prefilter assembly. The slow sand filter assembly operates comparable to typical slow sand filters in that it includes one or more layers of sand or gravel through which the influent water passes for filtering the water. However, the slow sand filter assembly disclosed herein has a combination of a number of structural elements that enable it to be "semi-portable." Specifically, the slow sand filter assembly includes at least a first container having a number of walls and a floor. Filtered water carrying pipes are disposed above the floor to receive the filtered water. The first container, particularly the floor thereof, is supported on a platform. A common pipe receives the filtered water from the filtered water carrying pipes. The common pipe is located outwardly of the container below the floor thereof and adjacent to the platform. In one embodiment, the walls and the floor of the container are made from a weldable material, such as steel, and have a size or dimensions to facilitate the making of the container and transporting the container to the site at which it can be filled with sand filter media. The walls of the container are, preferably, limited in their thickness and require use of vertically extending reinforcing ribs and at least one laterally extending brace member. In one embodiment, the slow sand filter assembly is comprised of two or more containers of reduced size to provide a modular design and further facilitate the manufacture and transportation of the containers to the site. In conjunction with transporting one or more of the containers, lift elements or lugs are part of the finished container so that a transport mechanism is able to engage one or more of the lift elements to raise it off the ground and position it on a transport vehicle.

Based on the foregoing summary, a number of important features of the present invention are readily identified. A practical and simplified apparatus is provided for denitrification of water. The major components thereof can be manufactured and assembled at a location remote from the site at which water is to be denitrified and transported to the site. One or more bioreactor units are packed with bioreactor media on which a dense film of biomass material grows for reacting with the nitrogen-containing water. Dimensional aspects of the bioreactor media are optimized to support a dense biofilm and dispersed plug flow. Relatedly, flow rate parameters or characteristics associated with the water to be denitrified have been identified as falling in certain necessary ranges. An intermittent air scouring procedure maintains the dense biofilm and the uniform dispersed plug flow, while avoiding channelization, by meeting specific air scouring parameters. A prefilter assembly and a slow sand filter assembly remove organic material from the denitrified water. The prefilter assembly includes a flow distribution device that provides even or uniform water flow over filter media having a very high porosity. The prefilter assembly has an OLR, an HLR and a detention time ($\tau_p$) that optimizes the removal of the organic material from the influent water received by the prefilter assembly. In connection with the transportability of the slow sand filter assembly, it includes a number of structural aspects including a modular design in which two or more containers for containing sand filter media receive influent denitrified water from the prefilter assembly. The containers of the slow sand filter assembly have limited or reduced dimensions to facilitate their manufacture and transportation. Preferably, more than one bioreactor unit is utilized and each of the bioreactor units and prefilter assembly is mounted on a skid or trailer to be transported to the desired site.

Additional advantages of the present invention will become readily apparent from the following discussion, particularly when taken together with the accompanying drawings.

BRIEF DESCRIPTION OF THE DRAWINGS

FIG. 3 schematically illustrates a longitudinal cross-sectional view of the prefilter body containing prefilter media for the prefilter assembly;

FIG. 4 schematically illustrates a cross-sectional view of the prefilter body with the prefilter media of the prefilter assembly;

DETAILED DESCRIPTION

Figure 1:
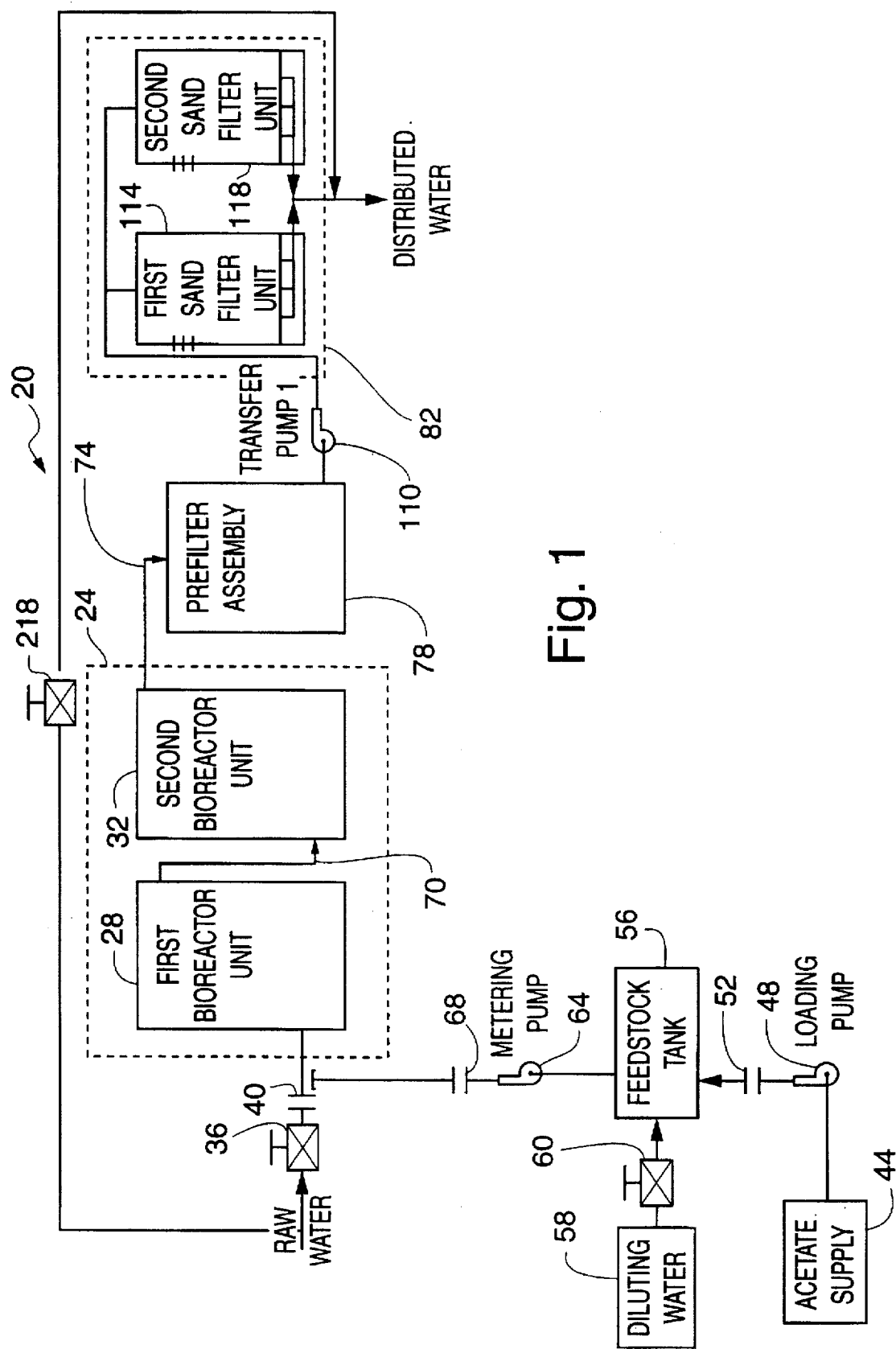
FIG. 1 is a block diagram of components of the biological denitrification system of the present invention.

With reference to FIG. 1, a system 20 for the biological denitrification of water is illustrated. The system 20 includes a bioreactor assembly 24 for removing nitrates and nitrites from influent water received by the bioreactor assembly 24. In one embodiment, the bioreactor assembly 24 includes first and second bioreactor units or towers 28, 32. Each of the bioreactor units 28, 32 contains bioreactor media having surfaces on which a film of biomass or reactant material is disposed. The biomass reacts with the influent water to remove the nitrogen. In particular, a bacterial respiration process occurs in which nitrogen gas and nitrous oxide are produced as harmless byproducts. The stoichiometric equations that define such process are well known and understood. The biomass or reactant material requires that a supplemental organic carbon be added to the influent that is received by the first bioreactor unit 28. In one embodiment, the carbon source chosen is acetic acid. This acid is readily available, non-toxic to humans, is soluble in water, and is readily degraded by a broad range of bacterial species. It can also be stored more readily, particularly in comparison with more flammable organic compounds such as methanol and ethanol.

With regard to the supplying of the influent water to the first bioreactor unit 28, the raw water from an outside source, such as underground water, is supplied to plumbing or piping that has a first solenoid valve 36 located along the water's flow path. When the first solenoid valve 36 is open, the raw water passes through a first flow switch 40. At a plumbing juncture, the raw water supplied through the flow switch 40 is combined with a source of supplemental organic carbon. In the preferred embodiment, this organic carbon source is an acetate supply 44 that has been diluted and pumped to the piping juncture for combining with the raw water. More particularly, the acetate supply 44 communicates with a loading pump 48 for pumping the acetate through a second flow switch 52. The acetate is fed to a feedstock tank 56 that also communicates with water for diluting the acetate. The diluting water 58 passes through a second solenoid valve 60, which can be controlled to either permit or prevent the flow of diluting water to the feedstock tank 56. The diluted acetate is pumped from the feedstock tank 56 using a metering pump 64. During the passage of the acetate to the juncture for combining with the raw water, a flow switch 68 monitors flow of the diluted acetate. The interaction or cooperation among the solenoid valves and flow switches, as well as pumps, will be described later in greater detail in connection with a description of the operation of the system.

The combination of the raw water and the diluted acetate is received by the first bioreactor unit 28 near a lower end thereof and moves through the first bioreactor unit 28 towards its upper end. During passage through the first bioreactor unit 28, the desired reactions occur in connection with the denitrification of the raw water using the bioreactor media. At the upper end of the first bioreactor unit 28, the effluent water is carried by an intermediate reactor pipe 70 under the force of gravity and pressure from the well pumps to the lower end of the second bioreactor unit 32. Further denitrification of the influent water received by the second bioreactor unit 32 occurs as the water moves upwardly and contacts the biomass or reactant material on the bioreactor media contained in the second bioreactor unit 32. In an alternative embodiment, the acetate can be fed to the bioreactor units 28, 32 at different locations along the length thereof.

With respect to the bioreactor media, it is an inert material that is non-biodegradable, non-toxic and approved for drinking water use. To achieve effective and efficient bioreactor unit operation including air scouring to remove excess biofilm from the media, the density of the bioreactor media must be less than about 1.2 g/cm$^3$ and, preferably, no greater than about the density of water (1.00 g/cm$^3$). The porosity of the bioreactor media must also meet a certain criterion, i.e., the porosity must be greater than 0.8 in order to allow for growth of a dense biofilm and maintain dispersed plug flow. Relatedly, the specific surface area of the media must be sufficiently large to support the dense biofilm growth, namely: specific surface area >20 m$^2$/m$^3$. In conjunction with using such bioreactor media to achieve the requisite denitrification, the bioreactor units 28, 32 must have certain operating characteristics or parameters. The input water to be denitrified must have a surface hydraulic loading rate that falls within a critical range. The surface hydraulic loading rate equals Q/A m$^3$/(m$^2$ * hr), where Q=volumetric flow rate (m$^3$/hr) and A=bioreactor unit cross-sectional surface area (m$^2$). More specifically, the range required for Q/A is:

$$1 \text{ m}^3/(\text{m}^2 * \text{hr}) < Q/A < 15 \text{ m}^3/(\text{m}^2 * \text{hr})$$

$$0.4 \text{ gal}/(\text{min} * \text{ft}^2) < Q/A < 6 \text{ gal}/(\text{min} * \text{ft}^2)$$

If Q/A should not be within this range, dispersed plug flow is not achieved and effective and efficient denitrification of the water does not occur. A further critical factor in maintaining uniformly dispersed plug flow and to achieve optimum contact between the water to be denitrified and the biofilm coating on the bioreactor media, a Peclet number must be maintained within a certain range. The Peclet number=Pe=u*L/D, where D=dispersion ($l^2/t$); u=bulk liquid velocity (l/t); and L=characteristic reactor length (l). The Peclet number is a well known parameter and is statistically determined in conjunction with a particular application. In accordance with the objectives of the present invention, the range of the Peclet number to maintain dispersed plug flow in each bioreactor unit 28, 32 is: 2.8<Pe<25. Another parameter that is critical to proper denitrification is the volumetric nitrate loading rate=Q * $C_N$/V (g-N/m$^3$/day), where Q=volumetric flow rate (M$^3$/day); $C_N$=influent concentration of nitrate (G-N/m$^3$, as nitrogen); and V=bioreactor unit volume on an empty bed basis (m$^3$). In order to maintain the dense biofilm coating on the bioreactor media, without channelization, the volumetric nitrate loading rate must be within the range of:

$$100 \text{ g/m}^3/\text{day} < Q * C_N/V < 5{,}000 \text{ g/m}^3/\text{day}$$

A bioreactor assembly outlet pipe 74 is provided at the upper end of the second bioreactor unit 32 and receives the denitrified water that has been denitrified to a level or concentration that is acceptable for human drinking or consumption. The opposite end of this outlet pipe 74 is connected to a prefilter assembly 78. The prefilter assembly 78 removes soluble, colloidal and fine particulate organic material that is added to the water during its movement through the bioreactor units 28, 32. In accomplishing this main objective, the prefilter assembly 78 works with a slow sand filter assembly 82, which is located downstream of the prefilter assembly 78, in removing such organic material. Removal of most of the organic matter from the denitrified water by the prefilter assembly 78 serves two primary functions, namely: reduction of clogging of the slow sand filter assembly 82 with either influent organic material or excess secondary biofilm growth on the bed in the slow sand filter assembly 82; and reduction of generated waste residual by reducing the required frequency of scraping of the slow sand filter assembly 82.

Figure 2:
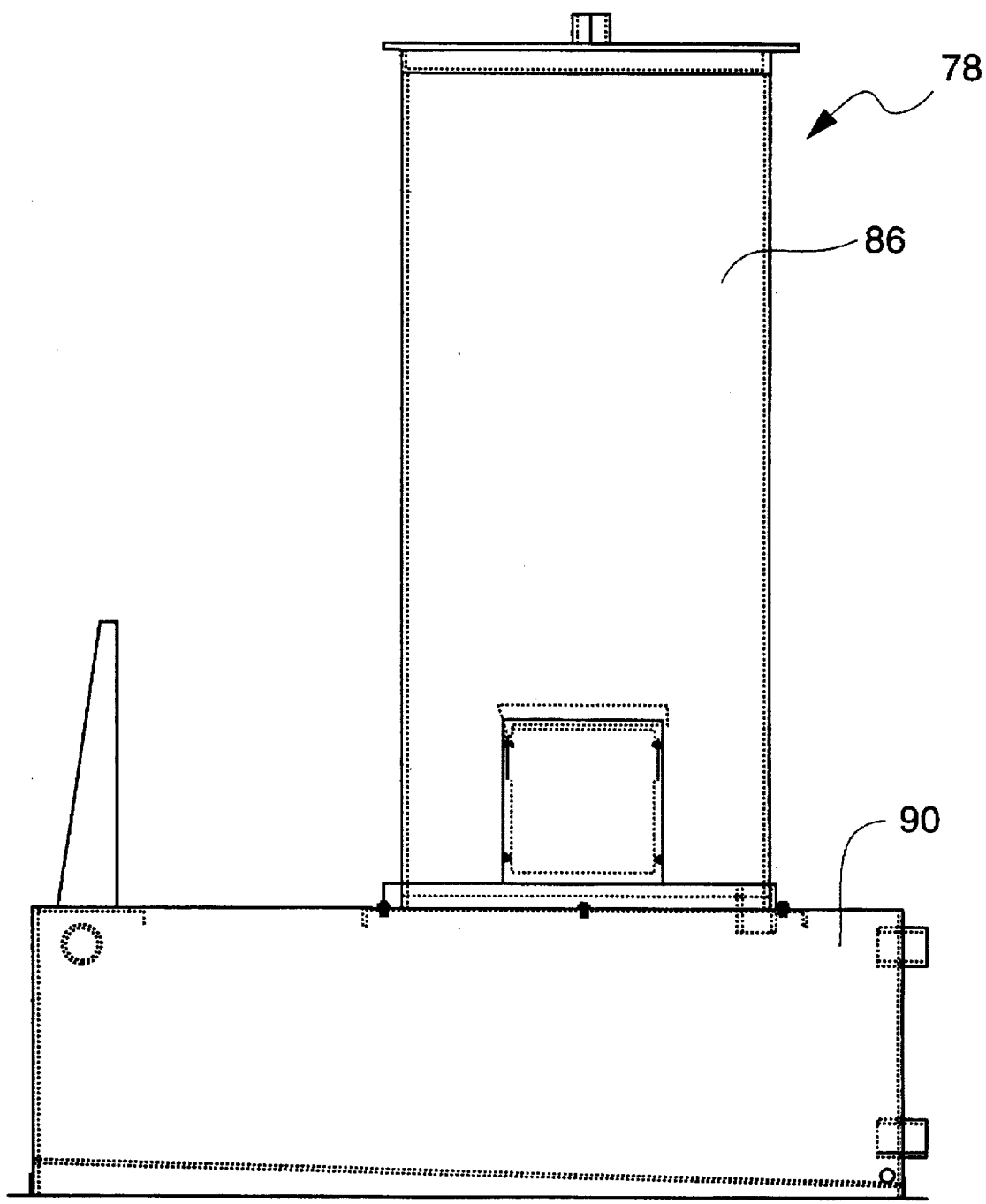
FIG. 2 illustrates a plan view of the prefilter body and holding tank of the prefilter assembly.

With reference to FIGS. 2–4, the prefilter assembly 78 includes a prefilter body 86 that, in one embodiment, is generally cylindrical in shape. At the bottom or lower end of the prefilter body 86, fluid or water communication is provided from the filter body 86 to a holding tank 90. The holding tank 90 stores water of a desired volume for use in controlling the flow of water through the system 20. In the disclosed embodiment, the holding tank 90 has different dimensions from the prefilter body 86 and is generally rectangular in shape. The holding tank 90 has an outlet formed near its bottom from which filtered effluent water from the holding tank 90 exits the prefilter assembly 78. Alternatively, the filter body 86 and the holding tank 90 can be made as a single integral cylindrical unit having the same length as when they are separate units.

With regard to achieving the desired filtering of the influent water in the prefilter assembly 78, the prefilter body 86 contains random-packed plastic media of very high porosity. As defined herein, such media porosity=η=volume voids/volume bulk media. That is, the media porosity is a function of the space occupied by the prefilter media and the space that is not occupied by the prefilter media within the prefilter body 86. In a preferred embodiment, 0.92>η<0.98. With reference to FIG. 3, the prefilter media 94 are illustrated schematically as being randomly packed in the prefilter body 86. A screen support 98 is also contained in the prefilter body 86 at the lower or bottom end thereof for use in supporting the prefilter media 94. As illustrated in FIG. 4, the prefilter media 94 is disposed throughout the cross-section of the prefilter body 86 and throughout its length. The prefilter media 94 is characterized by surfaces that readily enable them to be coated with a thin biofilm so that organic matter in the denitrified water is removed by a combination of sorption of organic molecules to the thin biofilm and biodegradation as the organic compounds diffuse to bacteria living in the prefilter media biofilm which metabolize them. The thin biofilm associated with the media 94 acts to remove relatively small size organic contaminants including soluble and colloidal molecules and suspended particles that are less than 25 microns in diameter including those that are about 1 micron in diameter.

With respect to the delivery of the influent water to the prefilter body 86, a flow distribution device 102 is fixedly held in the prefilter body 86 at the upper end thereof downstream of the influent denitrified water supplied to the prefilter assembly 86. The flow distribution device 102 receives the input water and acts to distribute it evenly throughout the cross-section of the prefilter body 86. Uniform flow distribution is necessary to enable a proper reaction to occur between the thin biofilm on the prefilter media 94 and the organic material contained in the influent water. In conjunction with such uniform and even distribution of the water, the water from any portion of the flow distribution device is the same as any other portion. For example, water outputted from the center of the flow distribution device 102 has substantially the same volume per unit of area as the water outputted by the portion of the device midway between the center of the device 102 and an end or peripheral edge thereof. Likewise, no "channelling" of the water outputted by the flow distribution device 102 occurs. That is, there is no length or column of water that passes through the prefilter body 86 having a flow that deviates, beyond a minimal amount, from the required or standard flow rate such that the necessary contact between the prefilter media 94 and the water does not occur, including no unwanted channelling along the wall or walls of the prefilter body 86.

Figure 5:
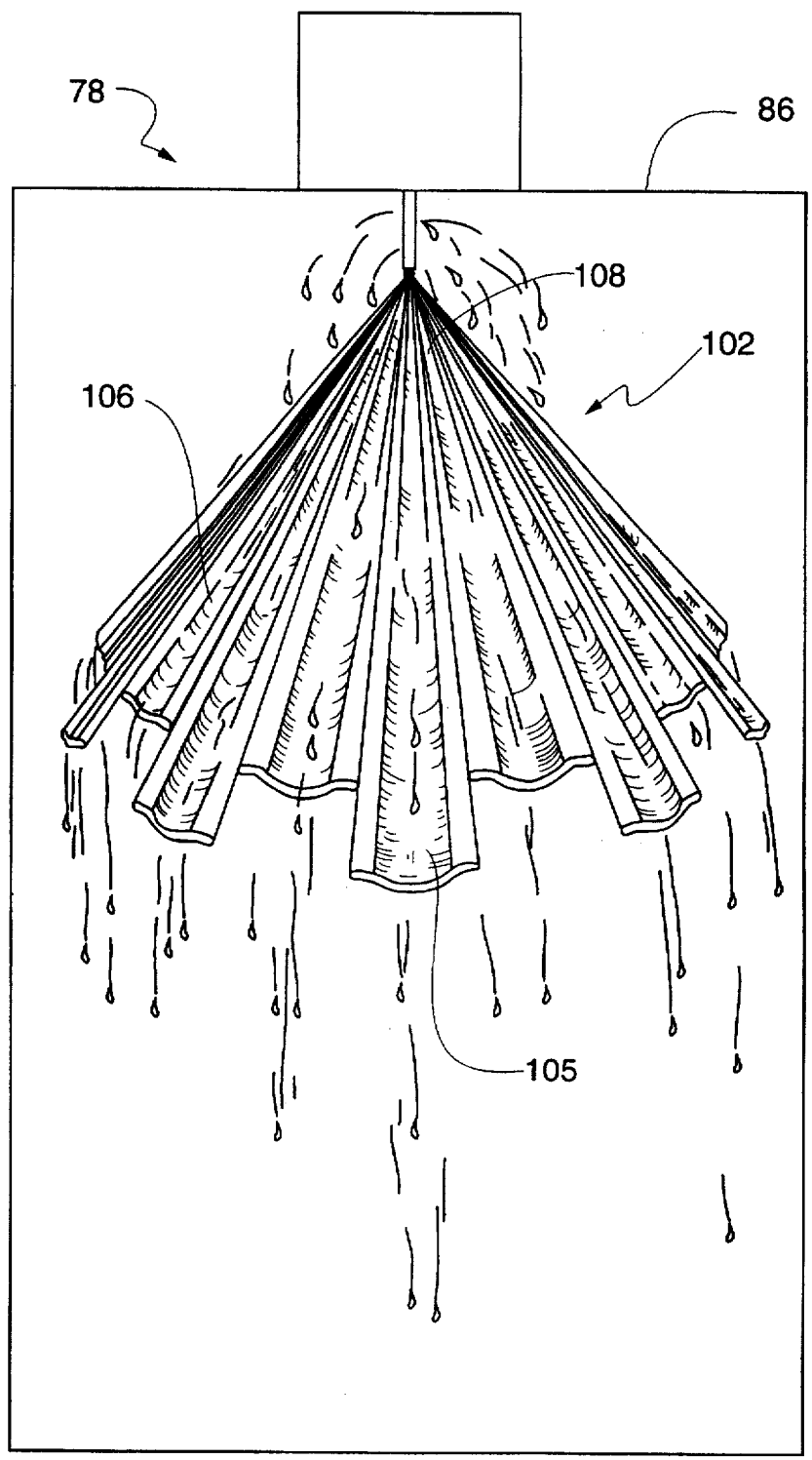
FIG. 5 illustrates one embodiment of the flow distribution device contained in the prefilter body, which is conical in shape.

With reference to FIG. 5, in one embodiment, the flow distribution device 102 includes a conical-shaped member 104 having a recess 106 and a number of apertures 108. The recess 106 extends substantially from the upper part to the lower part of the conical member 104. In this embodiment, the influent water is received by the recess 106. When the recess 106 is filled with water, the water at the top thereof overflows or escapes and flows to the apertures 108. This causes the water to be uniformly spread throughout the output area so that an even and uniform flow results, with the influent denitrified water exiting the flow distribution device 102 having such a uniform or even pattern and, only after this water pattern is established, coming into contact with the prefilter media 94. The weir 109 acts as a water flow control member to assist in achieving the desired uniform water distribution.

With respect to the prefilter assembly 78 configuration, a number of important parameters are next described in the context of their significance to proper removal of organic material. These parameters include:

total organic carbon (TOC) which refers to the combined soluble and colloidal organic material that is measured as being removed by the prefilter assembly 78;

organic loading rate (OLR) which refers to the amount of TOC that is removed using a certain amount of prefilter media 94 during the particular time period;

hydraulic loading rate (HLR) which refers to the water flow rate divided by the cross-sectional area of the prefilter body 86;

hydraulic detention time or film tau ($\tau_f$) which refers to the amount of time the influent water inputted to the prefilter assembly 78 remains in the prefilter body 86 and is in contact with the prefilter media 94.

The TOC in the influent water is comprised of a mixture of compounds, most of which are initially removed from the water by sorption onto the biofilm surface associated with the prefilter media 94 within a few seconds of contact with the thin biofilm. In one embodiment, the TOC is measured as the amount that passes a 1.3 micron filter. Because of the diversity of organic contaminants, there are probably many mechanisms by which these compounds are sorbed onto the biofilm. The OLR is based on the total volume of the prefilter media 94 and this total volume is available for surface removal of the TOC. That is, assuming that the biofilm coating of the prefilter media 94 is similar throughout the length of the prefilter body 86, the prefilter media volume corresponds to the biofilm surfaces. It has been also experimentally determined that the TOC of water after denitrification in the prefilter assembly 78 of the present invention is between about 1–10 mg/l TOC.

It has also been found or observed that the prefilter assembly 78 has a minimum or threshold OLR. In particular, such a minimum OLR should be only enough to sustain biofilm growth and which is quantitatively defined as: OLR>5 lb TOC/1000 ft³ media/day. A more important constraint that has been found or observed is that the OLR should not exceed the capacity of the prefilter assembly 78 to remove the TOC by a combination of sorption and biodegradation, namely: OLR<250 lb TOC/1000 ft³ media/day.

Similarly, the HLR has a determined range for achieving the desired organic material removal. The minimum value of the HLR of the prefilter assembly 78 assures substantial wetting of the thin biofilm surfaces of the prefilter media 94, namely: HLR>100 ft³/day/ft² prefilter body cross-section. A maximum or upper range value of HLR is also provided to insure thin film flow of the denitrified water in the prefilter body 86 past the prefilter media 94, namely: HLR<3000 ft³/day/ft² of prefilter body cross-section having the packed prefilter media.

With regard to the detention time ($\tau_f$), its derivation is as follows, with the accompanying assumptions:

1. the bulk velocity of liquid thin film is the same as the velocity of soluble, colloidal and suspended organic carbon particles;
2. the total cross-sectional area of the liquid thin film is equivalent to the cross-sectional area occupied by the prefilter media 94; and
3. the flow path of the influent water from the flow distribution device 102 is vertical and perpendicular to the cross-section of the prefilter body 86.

$$v = Q/A_s$$

Q=water flow rate (ft³/min)
v=bulk liquid velocity (ft/min)
$A_s$=total area of liquid thin film cross-section to bulk flow (ft²)

$$A_s = A*(1-\eta)$$

A=bulk surface area of prefilter body cross-section (ft²)
(A=π*(filter cross-section diameter)2/4)
η=media porosity=volume voids/volume bulk media $$v = Q/(A*(1-\eta)) \quad (1)$$

Define filmtau=$\tau_f$;

$$\tau_f = L/v \quad (2)$$

where L=media depth (ft).
Combining (1) and (2), $$\tau_f = L/(Q/(A*(1-\eta)))$$

$$\tau_f = L*A*(1-\eta)/Q \quad (3)$$

$$\tau_f = V_m*(1-\eta)/Q \quad (4)$$

where in (4), $V_m$=prefilter media volume.

With respect to the present system 20, for satisfactory removal of particulate, soluble and colloidal organic material from denitrified water, it has been found or observed that the detention time must meet the following threshold: $\tau_f > 0.15$ minute.

In one embodiment of the prefilter assembly 78, the prefilter body 86 is "semi-portable" in construction. Specifically, the prefilter body 86 is of a size and has dimensions that permit the prefilter body 86 to be made at a location remote from the site at which the system 20 is to be installed. By having such a size, the prefilter body 86 is constructed and then is able to be lifted or otherwise carried to a skid 88 (FIG. 9) or trailer in order to be moved by a suitable transport vehicle and then transported to the site for installation. Likewise, the holding tank 90 can be transported on the skid 88, with the flow distribution device 102 and the prefilter media 94 properly located within the filter body 86 at the manufacturing or assembly site, instead of being installed at the water denitrification site. In this semi-portable construction, the prefilter body should have a height in the range of about 2–10 feet and the width or diameter of the prefilter body 86 should be between about 1–5 feet. When these dimensions are outside these ranges, the semi-portability aspects are essentially lost.

Figure 6:
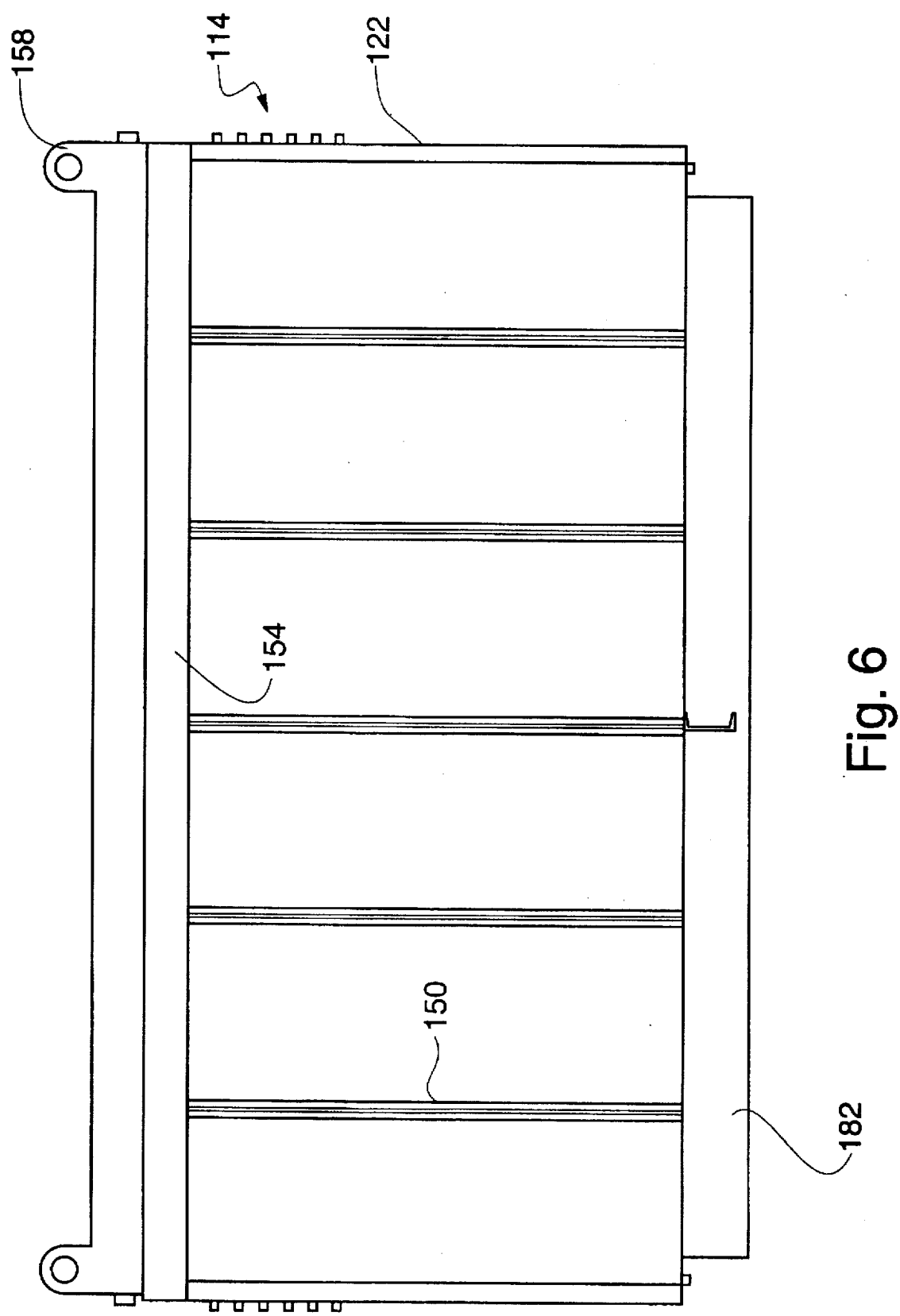
FIG. 6 is a plan view of a side wall of the container of the slow sand filter assembly.
Figure 7:
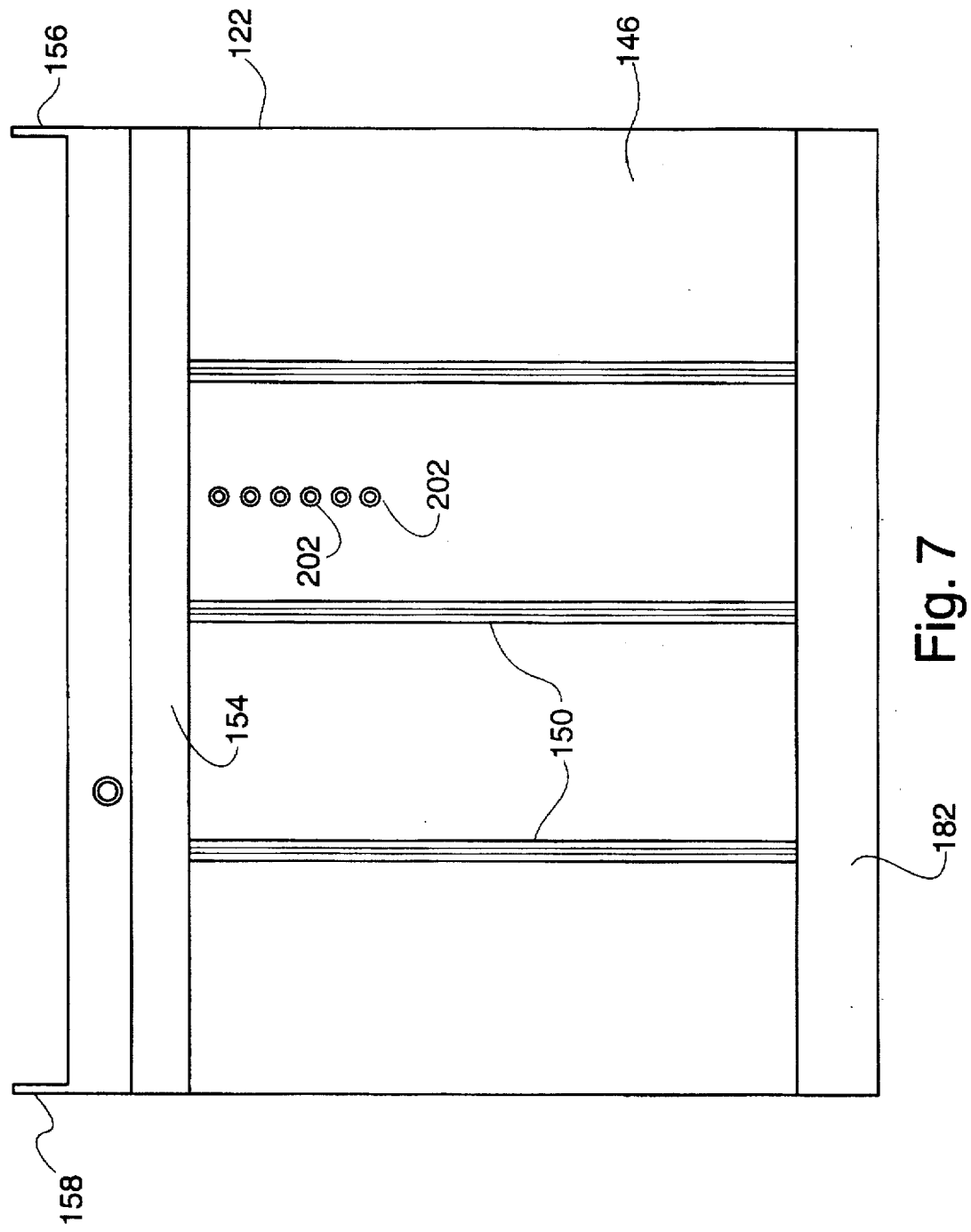
FIG. 7 is a plan view of an end wall of the container of the slow sand filter assembly.
Figure 8:
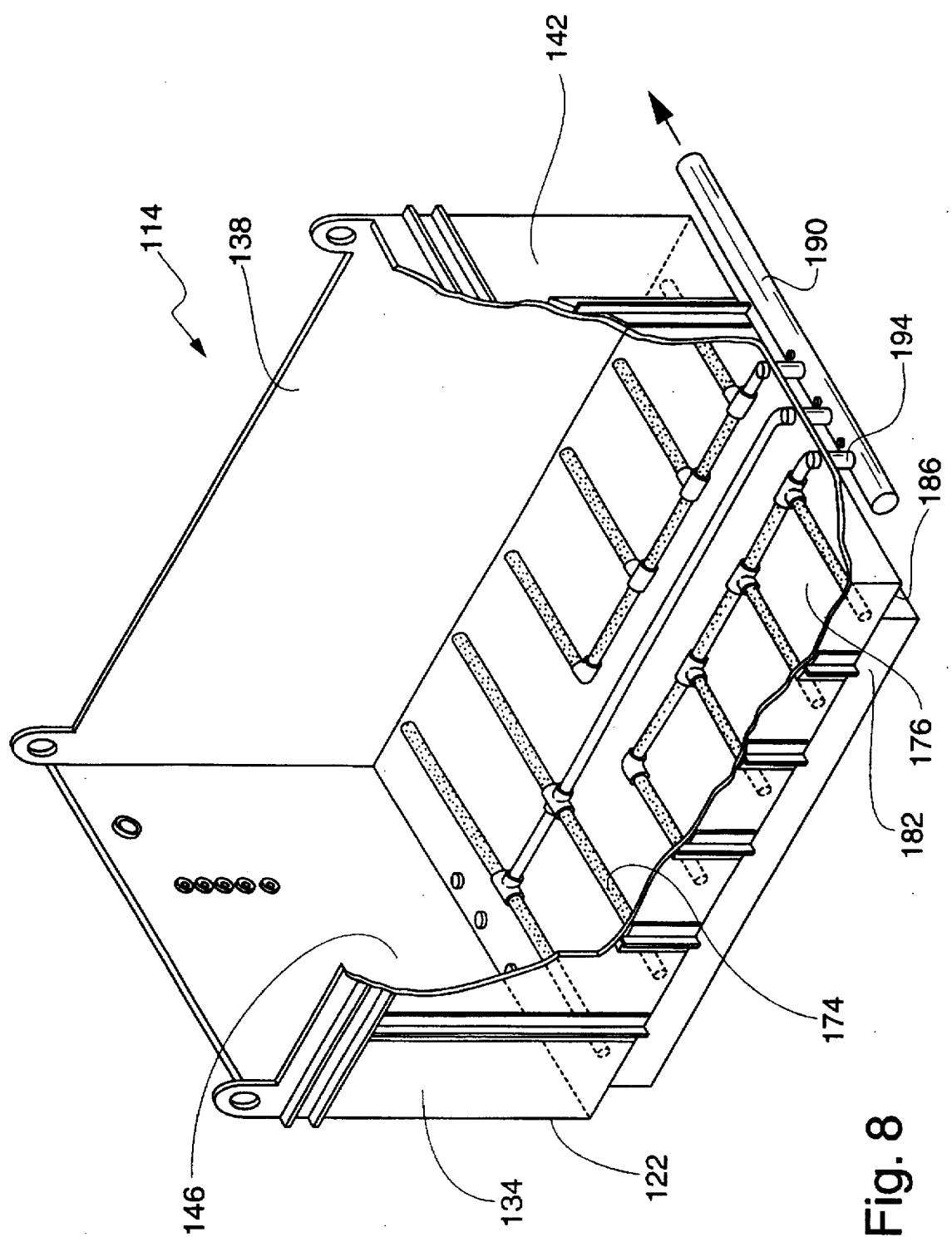
FIG. 8 schematically illustrates a container of the slow sand filter assembly with filtered water carrying pipes and a common pipe communicating with the filtered water carrying pipes.

Referring again to FIG. 1, the effluent water from the holding tank 90 (FIG. 2) is pumped to the slow sand filter assembly 82 using a transfer pump 110. The slow sand filter assembly 82 is intended to complete the removal of organic components from the denitrified water so that it is acceptable for drinking or otherwise meets established standards for water that is intended for human consumption. As is well known, the slow sand filter assembly 82 includes one or more layers of sand or gravel-type materials for filtering the effluent water received by the slow sand filter assembly 82. Its operation is also well known, including the providing of a desired level of effluent water at the top of the filter assembly 82 and maintenance procedures involved to ensure efficient operation of the filter assembly 82, including the removal of the "schmutzdecke" or accumulated material on the upper surface of the slow sand filter assembly layers. The slow sand filter assembly 82, however, incorporates important features in order to achieve a "semi-portable" construction. With reference to FIGS. 6–8, more details of the structural make-up of the slow sand filter assembly 82 including sand filter units 114, 118 are presented. In the illustrated embodiment of FIG. 1, more than one sand filtering unit is provided, although it should be understood that under certain circumstances only one sand filtering unit need be utilized. It is preferred that each of the two sand filter units 114, 118, as well as any other additional sand filtering unit, be structurally the same and the following description applies to each of such units. The sand filter unit 114 includes a filter container 122 having a pair of side walls 134, 138 and front and back end walls 142, 146. Each of these walls 134–146 is made of a weldable material, such as a steel material. The side walls 134, 138 are longer than the end walls 142, 146, with the length of the side walls being no greater than about 25 feet and preferably being no greater than about 12 feet. The height of the walls 134–146 is no greater than about 15 feet and preferably is no greater than about 8 feet and the area of each filter container is no greater than about 200 square feet in order to achieve the semi-portable characteristic of each such sand filter unit. Importantly also, the thickness of the walls 134–146 is limited and should be no greater than about 1 inch and preferably no greater than about 0.5 inch. Because of this limited thickness, the walls include vertically extending reinforcing members 150 at spaced intervals along the lengths of the walls 134–146. Similarly, a laterally extending brace member 154 extends along each of the walls 134–146 adjacent to the outer or exposed end of the filter container 122. A lift lug or element 158 is joined to the filter container 122 at each of its four corners. Each lift lug 158 has an opening for use by a lifting mechanism that is employed to grasp the lift lugs 158 and cause the sand filter unit 114 to be raised from the surface for movement to a transport vehicle, such as a flatbed trailer or carrier. By this modular construction, one or more sand filtering units can be provided for any particular system, depending upon the requirement or perceived need for slow sand filtering capability.

As seen in FIG. 8, above the bottom floor 170 of the filter container 122 are a number of filtered water carrying tubes having holes or slotted pipes 174. In the illustrated embodiment, the filtered water carrying tubes 174 are provided both vertically and laterally along the area of the floor 170. The tubes 174 have the holes for receiving filtered water which is carried by the tubes 174 to their ends, which are located adjacent the front wall 142 of the sand filter unit 114. The sand filter unit 114 also includes a platform or base 182 that supports the container 122 and is less in length than the length of the side walls 134, 138 so that a gap or space 186 is created between the surface on which the platform 182 is eventually positioned and the bottom of the floor 170. A common output pipe 190 is disposed in the space 186 and includes a number of inlets 194 that communicate with the ends of the filtered water carrying tubes 174. The water filtered by the sand filter unit 114 is carried by the common pipe 190 to a standby pipe 192, which has a height greater than the level of the sand in the filter container 122 but less than the height of the filter container 122. This permits the water level in the standby pipe 192 to be greater than the level of the sand. The standby pipe 192 is useful in carrying the filtered water for distribution and desired use.

In connection with controlling the level or head of the influent water overlying the top level or layer of sand material in the sand filtering unit 114, a selected one of a number of water levels can be provided. With reference to FIGS. 6 and 7, the back wall 146 has a number of vertically spaced openings formed therein with couplers 202 provided around each of the openings. Each of these openings is located at a different level in the container 122, near its upper or exposed end. Each of the openings and couplers 202 has a water level position associated therewith that can be sensed using the controls of the system 20. Specifically, for a selected one of the openings having an associated sensor, the head or water level can be increased until that particular position is sensed. Once sensed, no additional influent water is intended to be received by the sand filter unit 114. For a sensing unit associated with a coupler and an accompanying opening relatively higher in the filter container 122, a greater head or level of water can be provided, in comparison with the selection of a sensing unit associated with a coupler and opening which is located farther from the upper end of the filter container 122. This selection capability enables the operator to adjust or vary the head, depending upon the amount of water pressure that might be desired during a particular operating time for the sand filter unit 114. For example, in the case in which there has been a build-up of schmutzdecke, it may be advantageous to select a sensing unit for controlling the head or water level that is located at relatively higher position along the height of the back wall 146 so that a greater head exists for use in insuring that influent water will pass through the schmutzdecke to the filtering layers located therebelow.

When installed, the filter containers 122 are typically supported on a base that might be made from wood or cement, although it is feasible that the platform 182 be supported directly on the ground surface at the installation site. In such an embodiment, the filter containers are located entirely above ground and are exposed to the surrounding environment in that they are not covered or surrounded by the ground or any other material. In a related embodiment, one or more sand filter units is located outside, while one or more other sand filter units of a particular system 20 is located inside. That is, one or more of such sand filter units may be located within a building or other housing. During warm temperature months, both the sand filter units located outside and inside are part of the denitrification process. During colder months, when less water is commonly used, the sand filter units located outside are not employed and the denitrification process continues only with the sand filter units located inside the housing so that no water freezing problems occur using the slow sand filter assembly 82. In another embodiment, the exterior surfaces of the slow sand filter units are covered with insulation.

Figure 9:
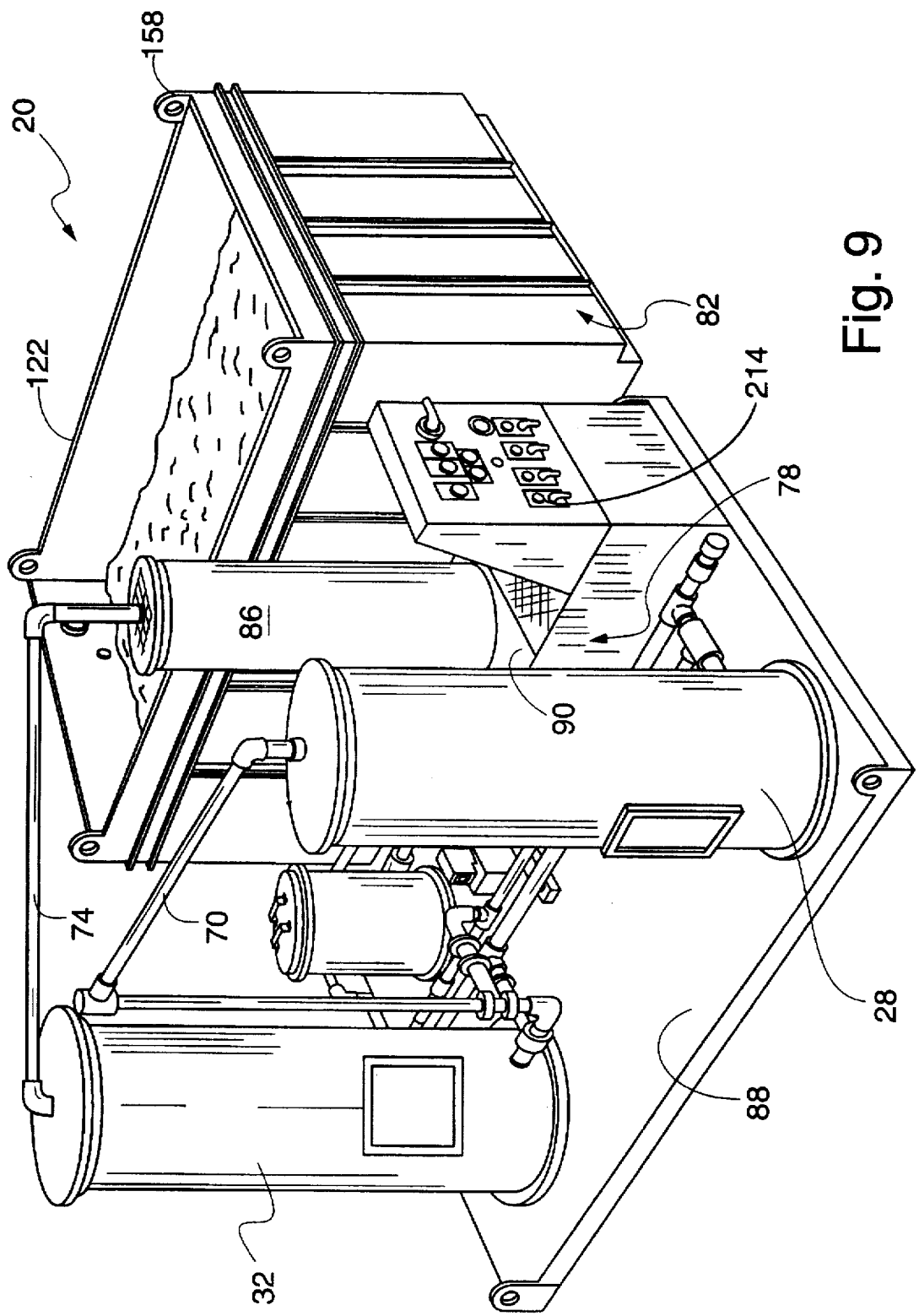
FIG. 9 schematically illustrates an arrangement of the major components of the biological denitrification system including a control panel.

With respect to the manufacture and installation of the slow sand filter assembly 82, each filter container 122 is made at a location remote from the site at which it is installed for the purposes of water denitrification. Separate steel walls 134–146 are obtained and welded together to form each filter container 122. The reinforcing members and brace members are also welded to the inner or outer surfaces of these walls 134–146. The platform 182 is joined to the floor 170 of the container 122. The lift lugs 158 are engaged by a lifting mechanism to position the sand filter unit on the transport vehicle. The plumbing or piping that is utilized in communicating or interconnecting with the other components of the system, as well as the filtered water carrying tubes or pipes, can be provided or assembled at the installation site. With regard to such installation, as illustrated in FIG. 9, the system 20 preferably includes a skid 88 for supporting the bioreactor units 28, 32, as well as the prefilter assembly 78 that includes the holding tank 90. Each of these components is manufactured or assembled at a remote site and transported to the use site utilizing the skid 88. At the use site, the water to be denitrified is input using appropriate plumbing.

With regard to a description of the operation of the system 20, reference is again made to FIG. 1. Generally, as previously described, well water is supplied to the bioreactor assembly 24 under certain controlled conditions. In controlling the system's operation, a control panel 214 (FIG. 9) is preferably provided for use in operation of the control components diagrammatically illustrated in FIG. 1. When raw water is made available, it is able to pass either through the first solenoid valve 36, which causes the water to pass through the water denitrification system 20, or the water can be diverted through a third solenoid valve 218, which bypasses the water denitrification system 20. The operator is able to control which of the two solenoid valves 36, 218 is in an open state. When one of these two valves is in an open state, the other of the two valves 36, 218 is closed. The state of the first solenoid valve 36 is also controlled by the third flow switch 68 that monitors the flow from the metering pump 64. When insufficient diluted acetate is flowing as determined using the third flow switch 68, the first solenoid valve 36 is shut off based on the determination that there is insufficient acetate being supplied for proper operation of the bioreactor assembly 24. Similarly, the first flow switch 40 controls the operation of the metering pump 64. Specifically, if insufficient raw water flow is determined using the first flow switch 40, the metering pump 64 is automatically controlled to be shut off. The third flow switch 68 is also involved in controlling the transfer pump 110. That is, if there is insufficient flow of acetate through the third flow switch 68, this causes the automatic shut off of the transfer pump 110.

Further controls are associated with the supplying of the acetate. When the loading pump 48 is on, the second solenoid valve 60 is controlled to be open in order to supply water for diluting the acetate being supplied to the feedstock tank 56. The second flow switch 52 monitors the flow of the acetate from the loading pump 48. When insufficient flow is detected, the second flow switch 52 is used in automatically turning off the loading pump 48. The feedstock tank 56 includes a level sensor positioned near the top of the tank 56. When this level sensor detects a predetermined higher level of diluted acetate in the tank 56, this causes the loading pump 48 to be turned off. A level sensor is also provided near the top of the holding tank 90. When a water level is reached that causes this level sensor to detect such a relatively high level, the first solenoid valve 36 is controlled so that it is automatically turned off. From the description, it should be appreciated that such controls are useful in insuring that suitable liquid including water and acetate is properly provided throughout the system 20.

Essential to the operation of the system 20 is an air scouring process that maintains the dense biofilm coating and the uniformly dispersed plug flow by removing excess biofilm or biomass. Over time, the growth of the biofilm results in an excess amount that must be removed from the bioreactor media. Such air scouring is conducted periodically, with the frequency of air scouring being determined based on dynamic pressure head associated with the bioreactor unit and measured at the base or bottom of the bioreactor unit. This frequency of air scouring must be within a critical range, namely: 0 psig+clean bed headloss<pressure at bottom of bioreactor unit <30 psig +clean bed headloss. When the air scouring does not occur within this range of frequency, uniform dispersed plug flow is lost and effective denitrification of the water does not occur. Clean bed headloss relates to the length of the bioreactor unit 32.

With regard to the air scouring process itself, a critical range of air scour flow per unit cross-sectional area of the bioreactor units 28, 32 has been determined. Such air scour flow must be of such a value to fluidize the bioreactor media and initiate the scouring; however, such air scour should not over-remove the biomass material and increase the associated delay of start-up of denitrification after an air scour. Such air scouring flow (standard cubic foot per minute/ft$^2$, SCFM/ft$^2$) is constrained within the range of: 0.5 SCFM/ft$^2$<air scour flow<5 SCFM/ft$^2$. Also as part of the air scouring process, a diffuser is utilized. This air diffuser is located at the bottom of each of the bioreactor units 28, 32 and is used to produce coarse bubbles sufficient for shearing of excess biofilm, based on a fraction of the characteristic diameter of the bioreactor media. The air scour diffuser orifice diameter must also meet a critical range of diameters, namely: 0.1 * d<diffuser orifice diameter<1.0 * d, where d=bioreactor media characteristic diameter. If the diffuser orifice diameter is less than the minimum value of this range, bubbles of sufficient size for shearing of excess biofilm are not produced, while a diffuser orifice diameter greater than the maximum value results in a lack of necessary separation among the bioreactor media, i.e., improper or ineffective fluidizing of the bioreactor media.

In conducting the air scouring process, then, with sufficient water in the bioreactor unit, the diffuser is activated to cause bubbles having a diameter within the critical range to move upward through the bioreactor unit and contact the excess biofilm on the bioreactor media. This contact includes a shearing force that causes excess biofilm to be removed. With the completion of the air scouring and the deactivation of the air diffuser, the liquid in the bioreactor unit is drained. The excess biomass material falls through a screen located at the bottom of the bioreactor unit. The screen is of a size to permit the excess biofilm to pass through it while the bioreactor media are of a size so that the screen blocks the passage of such media. Once this is accomplished, water can again be input to the bioreactor unit 32 for denitrification.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments discussed hereinabove are further intended to explain the best mode known of practicing the invention and to enable others skilled in the art to utilize the invention in such, or in other, embodiments and with the various modifications required by their particular application or uses of the invention. It is intended that the appended claims be construed to include alternative embodiments to the extent permitted by the prior art.

What is claimed is:

1. A method for denitrification of water using at least one bioreactor unit having bioreactor media, comprising:

coating said bioreactor media with biofilm;

inputting water and carbon material to said bioreactor unit;

operating said bioreactor unit based on a number of predetermined parameters including at least one of the following: surface hydraulic loading rate, Peclet number, volumetric nitrate loading rate, bulk liquid velocity and a length of said bioreactor unit;

contacting said biofilm with said water;

denitrifying said water using said biofilm;

conducting periodically an air scouring process that includes the following:

keeping water in said bioreactor unit during said air scouring process;

introducing air bubbles that flow upward in said bioreactor unit;

fluidizing said bioreactor media with said air bubbles in which said bioreactor media are separated from each other;

removing excess biofilm that grows due to said carbon material using substantially said air bubbles while maintaining sufficient biofilm with said bioreactor media for subsequent use in denitrifying water; and draining liquid from said bioreactor unit; and re-inputting water and carbon material to said bioreactor unit after said draining step;

wherein said step of conducting relates to pressure adjacent to a bottom of said bioreactor unit, with said pressure being between: 0 psig+clean bed headloss associated with said bioreactor unit and 30 psig+clean bed headloss associated with said bioreactor unit and in which said clean bed headloss relates to said length of said bioreactor unit.

2. A method, as claimed in claim 1, wherein:

said surface hydraulic loading rate is greater than 1 $m^3/(m^2 * hr)$ and less than 15 $m^3/(m^2 * hr)$.

3. A method, as claimed in claim 1, wherein:

said surface hydraulic loading rate is greater than 0.4 gal/(min * $ft^2$) and less than 6 gal/(min * $ft^2$).

4. A method, as claimed in claim 1, wherein:

said Peclet number is greater than 2.8 and less than 25.

5. A method, as claimed in claim 1, wherein:

said volumetric nitrate loading rate is greater than 100 $g/m^3$/day and less than 5,000 $g/m^3$/day.

6. A method, as claimed in claim 1, wherein:

said conducting step includes discontinuing inputting said water and said carbon material to said bioreactor unit before said introducing step.

7. A method, as claimed in claim 1, wherein:

said conducting step includes providing flow associated with said fluidizing step in the range of between 0.5 standard cubic foot per minute/$ft^2$ and 5 standard cubic foot per minute/$ft^2$.

* * * * *